United States Patent

Szczyrbowski et al.

Patent Number: 5,216,542
Date of Patent: Jun. 1, 1993

[54] COATING, COMPOSED OF AN OPTICALLY EFFECTIVE LAYER SYSTEM, FOR SUBSTRATES, WHEREBY THE LAYER SYSTEM HAS A HIGH ANTI-REFLECTIVE EFFECT, AND METHOD FOR THE MANUFACTURING OF THE COATING

[75] Inventors: Joachim Szczyrbowski, Goldbach; Klaus Hartig, Ronneburg; Stephan Roegels, Rodenbach; Anton Zmelty, Hoesbach, all of Fed. Rep. of Germany

[73] Assignee: Leybold Aktiengesellschaft, Fed. Rep. of Germany

[21] Appl. No.: 599,988

[22] Filed: Oct. 19, 1990

[30] Foreign Application Priority Data

Dec. 19, 1989 [DE] Fed. Rep. of Germany ....... 3941797

[51] Int. Cl.$^5$ .......................... G02B 1/10; G02B 5/28
[52] U.S. Cl. .................................. 359/588; 359/585; 359/586; 359/590; 427/166
[58] Field of Search ............... 359/580, 582, 585, 586, 359/587, 588, 590, 581; 427/166

[56] References Cited

U.S. PATENT DOCUMENTS

| | | |
|---|---|---|
| 3,695,910 | 10/1972 | Louderback et al. |
| 3,761,160 | 9/1973 | Apfel et al. |
| 3,829,197 | 8/1974 | Thelen . |
| 3,854,796 | 12/1974 | Thelen . |
| 3,885,855 | 5/1975 | Gross . |
| 3,922,068 | 11/1975 | Uetsuki . |
| 3,926,508 | 12/1975 | Harmsen et al. ........... 427/162 |
| 3,947,092 | 3/1976 | Flad ........................ 350/171 |
| 4,116,791 | 9/1978 | Zega . |
| 4,142,958 | 3/1979 | Wei et al. ................ 204/298 |
| 4,188,452 | 2/1980 | Groth ...................... 428/336 |
| 4,387,960 | 6/1983 | Tani . |
| 4,534,841 | 8/1985 | Hartig et al. . |
| 4,535,000 | 8/1985 | Gordon . |
| 4,548,691 | 10/1985 | Dietrich et al. |
| 4,609,267 | 9/1986 | Deguchi et al. ............ 359/586 |
| 4,620,847 | 7/1986 | Born et al. . |
| 4,634,919 | 1/1987 | Yuge et al. ............... 313/113 |
| 4,690,871 | 9/1987 | Gordon ..................... 428/432 |
| 4,804,883 | 2/1989 | Muller et al. . |
| 4,868,004 | 9/1989 | Zultzke et al. . |
| 5,085,926 | 2/1992 | Iida et al. ................ 359/580 |

FOREIGN PATENT DOCUMENTS

0239280A2 9/1987 European Pat. Off. .

(List continued on next page.)

OTHER PUBLICATIONS

"Dekorative und funktionelle Hartstoffchicten auf Flachglassubstraten" In: Silikattechnik, 1987, H.8, S.281-283.

(List continued on next page.)

Primary Examiner—Bruce Y. Arnold
Assistant Examiner—James Phan
Attorney, Agent, or Firm—Hill, Steadman & Simpson

[57] ABSTRACT

A coating, composed of an optically effective layer system for substrates, whereby the layer system has a high antireflective effect. On a front side of the substrate, facing the observer, in sequence from the front side to the observer, a first layer is arranged on the substrate, functioning as dielectric and comprising metal oxide. Thereupon follows a second layer comprising nitride, preferably TiN$_x$ (x is equal to or greater than 1, preferably x=1.05). A third layer follows functioning as dielectric and comprising metal oxide. Thereupon a fourth layer follows comprising nitride, preferably TiN$_x$ (x is equal to or greater than 1, preferably x=1.05). A fifth layer follows functioning as dielectric comprising metal oxide. On a backside of the substrate a TiN$_x$-layer (x≧1, preferably x=1.05) is arranged. The adequate selection of certain materials for the individual layers, of certain layer thicknesses and of a certain sequence of the individual layers results in a surprisingly good antireflective coating, contrast increase and antistatic effect. These good optical features of the layer system are reached with a small number of layers and with thin layer thicknesses. This, in turn, leads to an extremely cost saving manufacturing of the coating.

48 Claims, 2 Drawing Sheets

FOREIGN PATENT DOCUMENTS

| | | |
|---|---|---|
| 736411 | 6/1943 | Fed. Rep. of Germany . |
| 742463 | 1/1944 | Fed. Rep. of Germany . |
| 2049738B2 | 4/1971 | Fed. Rep. of Germany . |
| 1596816 | 9/1971 | Fed. Rep. of Germany . |
| 2448499 | 5/1975 | Fed. Rep. of Germany . |
| 3125267 | 1/1983 | Fed. Rep. of Germany . |
| 2902848 | 2/1983 | Fed. Rep. of Germany . |
| 2256435 | 3/1984 | Fed. Rep. of Germany . |
| 3302827 | 8/1984 | Fed. Rep. of Germany . |
| 2646513 | 10/1984 | Fed. Rep. of Germany . |
| 3311815A1 | 10/1984 | Fed. Rep. of Germany . |
| 3404736 | 10/1984 | Fed. Rep. of Germany . |
| 3627248 | 4/1987 | Fed. Rep. of Germany . |
| 3636676 | 5/1987 | Fed. Rep. of Germany . |
| 8706793U1 | 8/1987 | Fed. Rep. of Germany . |
| 3629996A1 | 3/1988 | Fed. Rep. of Germany . |
| 3742204A1 | 6/1989 | Fed. Rep. of Germany . |
| 3430727 | 7/1989 | Fed. Rep. of Germany . |
| 203903 | 11/1983 | German Democratic Rep. . |
| 204693 | 12/1983 | German Democratic Rep. . |
| 209176 | 4/1984 | German Democratic Rep. . |
| 225860 | 8/1985 | German Democratic Rep. . |
| 223344 | 1/1943 | Switzerland . |
| 1397316 | 6/1975 | United Kingdom . |
| 2138966 | 10/1984 | United Kingdom . |
| 2183363 | 6/1987 | United Kingdom . |

OTHER PUBLICATIONS

"Anwendung der Vakuumbeschichtung in der Glasindustrie" In: Silikattechnik 39, 1988, H.9, S.296–300.

"Chemical Abstracts" vol. 104, May 1986, No. 20, S.286, Ref. 165118c.

"Chemical Abstracts" vol. 103, Nov. 1985, No. 20, S.297, Ref. 165118c.

"Chemical Abstracts" vol. 102, Mar. 1985, No. 10, S.167 Ref. 81695e.

"Chemical Abstracts" vol. 101, Dec. 1984, No. 26, S.243, Ref. 234577z.

Leybold brochure entitled: "Glass Coating News; Leybold at Inter Glass Metal", Oct. 5, 1989, p. 1.

Buehler et al., "All-oxide broadband anti-reflection coatings by reactive ion plating deposition", Applied Optics, Aug. 15, 1988, vol. 27, No. 16, pp. 3359–3361.

Beister et al., "Zur Herstellung von Dekorativen Titannitrid-Schichten auf Glasartikeln darch reaktives DE--Plasmatronsputtern" Silikattechnik 39 (1988) Heft 9, pp. 316–318.

COATING, COMPOSED OF AN OPTICALLY EFFECTIVE LAYER SYSTEM, FOR SUBSTRATES, WHEREBY THE LAYER SYSTEM HAS A HIGH ANTI-REFLECTIVE EFFECT, AND METHOD FOR THE MANUFACTURING OF THE COATING

BACKGROUND OF THE INVENTION

The invention is related to a coating composed of an optically effective layer system, for substrates, whereby the layer system has a high antireflective effect.

There is a wide range of layer systems for substrates, particularly for glass, which fulfill certain optical functions. The present invention involves a type of layer system using antireflective layers, or respectively, antireflective layer systems.

The German publication DE-OS 3,629,996 revealed an adaptor unit/aggregate for the cathode ray tube of monitors, television sets and such, composed of a glass disk, particularly a gray glass disk, a frontside antireflection device and a backside absorption coating, whereby the absorption coating comprises metal atoms.

In this German publication it is suggested that the absorption coating is structured in one-layered fashion from chrome, a chrome/nickel alloy or silicides, established and grounded antistatically, and provided with a thickness which lowers the light transmission compared to the uncoated glass disk by approximately one third.

The U.S. Pat. No. 3,854,796 suggests another coating for the reduction of reflection. The coating is to be applied on a substrate having a plurality of layers. In the sequence beginning at the substrate, the '796 patent describes the following arrangement: three groups of at least two lambda/4-layers, the successive layers of the first group have a refractive index lying below the refractive index of the substrate. The layers of the second group have an increasing refractive index and the layers of the third group have a refractive index below that of the substrate. More details can be ascertained from the cited '796 patent.

In U.S. Pat. No. 3,761,160 a broadband-antireflection-coating coated onto substrates is suggested. At least four layers are disclosed for glass with a high index and at least six layers are disclosed for glass with a low index. More details can be learned from the cited '160 patent.

U.S. Pat. No. 3,695,910 describes a method for the application of a antireflective coating on a substrate. This coating is composed of several individual layers. The method for the application of the antireflection coatings ensues under vacuum, namely with the use of electron beams.

U.S. Pat. No. 3,829,197 describes a antireflection coating fashioned as a multilayer system. This coating is to be applied on a strongly refractive substrate. The layer system is composed of five individual layers which are mutually adapted with regard to their refractive indices and optical thicknesses. This adaptation is to achieve a favorable antireflection curve with a broad, flat, center part.

Swiss patent 223,344 deals with a coating for the reduction of surface reflection. The coating is composed of at least three layers with various refraction coefficients. The reduction of the surface reflection can be achieved, according to this reference, by a certain selection of refraction coefficients of the individual layers.

SUMMARY OF THE INVENTION

The invention is based on the following objectives:

An object of the invention is to provide effective antireflective coatings for transparent substrates.

Transparent substrates are necessary in a plurality of examples of modern equipment and devices. Manufacturers of this equipment and these devices have high requirements regarding optical and other features of these substrates.

The invention is to fulfill these requirements, particularly with an antireflection coating, and with regards to a corresponding contrast increase and an increase of an antistatic effect.

Another objective is to provide for an economical manufacture of the antireflection coating system. A minimum number of layers is desired. Simultaneously, the thicknesses of the layers are to be thin. Cost saving materials are to be employed.

With the invention, a concept is suggested whereby sputtering can be performed in DC-reactive fashion with a magnetron from a metal target.

Actually, the use of metal layers for antireflective systems is basically known. It was found, however, that the known metal layers are disadvantageously soft for everyday operation.

Therefore, one of the objectives of the present invention is to find a substitute for the known soft metal layers (Ag, Ni, . . . ). This substitute shall be hard and scratch-resistant. On the one hand, it shall be ceramically hard, on the other hand, however, it shall also have the effect of a metal-type optical unit.

The invention, the stated objects are solved in that, on a side of the substrate facing the observer, or "front side" in sequence from the front side toward the observer, a first layer is arranged directly on the substrate functioning as a dielectric and comprising metal oxide. Subsequently, a second layer is arranged thereupon, comprising nitride, preferably $TiN_x$ (with x equal to or greater than 1, preferably x=1.05). Subsequently, a third layer is arranged thereupon, functioning as a dielectric, comprising metal oxide. Thereupon a fourth layer is arranged comprising nitride, preferably $TiN_x$ (with x equal to or greater than 1, preferably x=1.05). Thereupon a fifth layer is arranged, functioning as dielectric and comprising metal oxide.

It can be provided that the first layer comprises oxides from the group: $SnO_x$ (with x equal to or less than 2, preferably x=2), $ZrO_2$, $ZnO$, $Ta_2O_5$, NiCr-oxide, $TiO_2$, $Sb_2O_3$, $In_2O_3$ or mixed oxides of the oxides from this group. It is suggested that the second layer comprises nitrides of the group $TiN_x$ (with x equal to or greater than 1, preferably x=1.05), ZrN. The third layer can comprise oxides of the group: $SnO_x$ (with x equal to or less than 2, preferably x=2), $ZrO_2$, $ZnO$, $Ta_2O_5$, NiCr-oxide, $TiO_2$, $Sb_2O_3$, $In_2O_3$, or mixed oxides of the oxides from this group. Furthermore, it is provided that the fourth layer comprises nitrides of the group $TiN_x$ (with x equal to or greater than 1, preferably x=1.05), ZrN.

As further embodiment of the invention it is suggested that the fifth layer has low-refracting materials, particularly with a refractive index n equal to or less than 1.7. Another provision is that the fifth layer comprises oxides of the group $SiO_2$, $Al_2O_3$, AlSi-oxide, NiSi-oxide, MgO or oxide-fluorides of the same group. Alternatively, it is suggested that the fifth layer comprises $MgF_2$.

In a special group of exemplary embodiments it is provided that between the first and the second layer an adhesive layer is arranged. The adhesive layer can comprise Ni or $NiO_x$ with x less than 1. On the other hand, one can provide that the adhesive layer comprises Cr or Cr-suboxide. In a further exemplary embodiment it is suggested that the adhesive layer comprises a NiCr alloy, preferably NiCr with 80 weight per cent Ni and 20 weight per cent Cr as metal or metal suboxide (NiCr-oxide). It is also possible that the first layer comprises $NiCrO_x$ and can function as adhesive. $NiCrO_x$ can be applied by suboxide coating.

In a special exemplary embodiment where the substrate is composed of glass, for example float glass, it is proposed that the first layer comprises $SnO_x$ (with x equal to or less than 2, preferably x=2), the following second layer comprises $TiN_x$ (with x equal to or greater than 1, preferably x=1.05) the following third layer comprises $SnO_x$ (with x equal to or less than 2, preferably x=2), the following fourth layer comprises $TiN_x$ (with x equal to or greater than 1, preferably x=1.05), the following fifth layer comprises $Al_2O_3$, and that on a back side of the substrate facing away from the observer a backside layer comprising $TiN_x$ (with x equal to or greater than 1, preferably x=1.05) is applied.

An alternative exemplary embodiment consists thereof that the first layer comprises $SnO_x$ (with x equal to or less than 2, preferably x=2), the following second layer comprises $TiN_x$ (with x equal to or greater than 1, preferably x=1.05) the following third layer comprises $SnO_x$ (with x equal to or less than 2, preferably x=2), the following fourth layer comprises $TiN_x$ (with x equal to or greater than 1, preferably x=1.05), the following fifth layer comprises $Al_2O_3$, that between the first layer and the second layer an adhesive layer is arranged comprising NiCr or NiCr-oxide, and that on the back side of the substrate the backside layer comprising $TiN_x$ (with x equal to or greater than 1, preferably x=1.05) is applied.

Another exemplary embodiment is that the first layer comprises $SnO_x$ (with x equal to or less than 2, preferably x=2), the following second layer comprises $TiN_x$ (with x equal to or greater than 1, preferably x=1.05), the following third layer comprises $SnO_x$ (with x equal to or less than 2, preferably x=2), the following fourth layer comprises $TiN_x$ (with x equal to or greater than 1, preferably x=1.05), the following fifth layer comprises $SiO_2$, that between the first layer and the second layer an adhesive layer is arranged comprising NiCr or NiCr-oxide, that on the back side of the substrate the backside layer comprising $TiN_x$ (with x equal to or greater than 1, preferably x=1.05) is applied.

In a further exemplary embodiment it is suggested that the first layer comprises NiCr-oxide and can function as dielectric and adhesive, the following second layer comprises $TiN_x$ (with x equal to or greater than 1, preferably x=1.05), the following third layer comprises $SnO_x$ (with x equal to or less than 2, preferably x=2), the following fourth layer comprises $TiN_x$ (with x equal to or greater than 1, preferably x=1.05), the following fifth layer comprises $Al_2O_3$, and that on the back side of the substrate the backside layer comprising $TiN_x$ (with x equal to or greater than 1, preferably x=1.05) is applied.

In a further exemplary embodiment it is suggested that the first layer comprises NiCr-oxide and can function as dielectric and adhesive, the following second layer comprises $TiN_x$ (with x equal to or greater than 1, preferably x=1.05), the following third layer comprises $SnO_x$ (with x equal to or less than 2, preferably x=2), the following fourth layer comprises $TiN_x$ (with x equal to or greater than 1, preferably x=1.05), the following fifth layer comprises $SiO_2$, and that on the back side of the substrate the backside layer comprising $TiN_x$ (with x equal to or greater than 1, preferably x=1.05) is applied.

Another exemplary embodiment suggests that the first layer has a thickness of 170 angstrom +/−20%, that the second layer has a thickness of 170 angstrom +/−20%, that the third layer has an optical thickness of 5550/4 angstrom +/−20%, that the fourth layer has a thickness of 110 angstrom +/−20%, that the fifth layer has an optical thickness of 5550/4 angstrom, and that such values for the respective layer thicknesses are selected within the cited layer thickness tolerances, which take into account the interdependence between the individual layer thicknesses and the materials used.

In a further exemplary embodiment where the substrate is composed of glass, with a refractive index of preferably n=1.52, it is suggested that the first layer comprises $SnO_x$ (with x equal to or less than 2, preferably x=2) and has a thickness of 170 angstrom, that the second layer comprises $TiN_x$ (with x equal to or greater than 1, preferably x=1.05) and has a thickness of 190 angstrom, that the third layer comprises $SnO_x$ (with x equal to or less than 2, preferably x=2) and has a thickness of 500 angstrom, that the fourth layer comprises $TiN_x$ (with x equal to or greater than 1, preferably x=1.05) and has a thickness of 130 angstrom, and that the fifth layer comprises $Al_2O_3$ and has a thickness of 730 angstrom.

A preferred exemplary embodiment is represented by a substrate composed of glass with a refractive index of preferably n=1.52 whereby it is provided that the first layer comprises $SnO_x$ (with x equal to or less than 2, preferably x=2) and has a thickness of 170 angstrom, that the second layer comprises $TiN_x$ (with x equal to or greater than 1, preferably x=1.05) and has a thickness of 175 angstrom, that the third layer comprises $SnO_x$ (with x equal to or less than 2, preferably x=2) and has a thickness of 500 angstrom, that the fourth layer comprises $TiN_x$ (with x equal to or greater than 1, preferably x=1.05) and has a thickness of 110 angstrom, that the fifth layer comprises $Al_2O_3$ and has a thickness of 730 angstrom.

Furthermore, the suggestion is made that on the substrate side not facing the observer, the backside layer is arranged comprising $TiN_x$ (with x equal to or greater than 1, preferably x=1.05).

Thereby it can be provided that the backside layer comprises $TiN_x$ (with x equal to or greater than 1, preferably x=1.05) and has a thickness of 70 angstrom, that the substrate is composed of glass, has a thickness of 2 mm and a refractive index of n=1.52, that the first layer comprises $SnO_x$ (with x equal to or less than 2, preferably x=2) and has a thickness of 170 angstrom and a refractive index n=2.05, that the second layer comprises $TiN_x$ (with x equal to or greater than 1, preferably x=1.05) and has a thickness of 190 angstrom, that the third layer comprises $SnO_x$ (with x equal to or less than 2, preferably x=2) and has a thickness of 500 angstrom and a refractive coefficient n=2.05, that the fourth layer comprises $TiN_x$ (with x equal to or greater than 1, preferably x=1.05) and has a thickness of 130 angstrom, and that the fifth layer comprises $Al_2O_3$ and has a thickness of 730 angstrom and a refractive index of n=1.6.

In the framework of a further exemplary embodiment it is proposed that the backside layer comprises $TiN_x$ (with x equal to or greater than 1, preferably x=1.05), that the substrate is composed of glass, has a thickness of 2 mm and a refractive index n=1.52, that the first layer comprises NiCr-oxide, a thickness of 170 angstrom and a refractive index n=2.1, that the second layer comprises $TiN_x$ (with x equal to or greater than 1, preferably x=1.05) with a thickness of 170 angstrom, that the third layer comprises $SnO_x$ (with x equal to or less than 2, preferably x=2) has a thickness of 500 angstrom and a refractive coefficient n=2.05, that the fourth layer comprises $TiN_x$ (with x equal to or greater than 1, preferably x=1.05) and has a thickness of 110 angstrom, and that the fifth layer comprises $SiO_2$ and has a thickness of 730 angstrom and a refractive index n=1.5.

For the manufacturing of the coating, a cathode sputtering method is suggested, particularly a DC-reactive sputtering from a target with a magnetron.

Particularly, a reactive sputtering from a Sn-target with a magnetron is suggested in the presence of a sputter gas mixture comprising Ar and $O_2$, for the generation of a layer composed of $SnO_x$ (with x equal to or less than 2, preferably x=2), given a pressure of approximately $5 \times 10^{-3}$ mbar.

In an analogous manner it can be provided that a layer is generated composed of $SiO_2$ via reactive sputtering from an Si-target with a magnetron a layer in the presence of a sputter gas mixture comprising Ar and $O_2$, given a pressure of approximately $5 \times 10^{-3}$ mbar.

Furthermore, it is suggested that a layer composed of $Al_2O_3$ is generated, via reactive sputtering from an Al-target with a magnetron in the presence of a sputter gas mixture comprising Ar and $O_2$, given a pressure of approximately $5 \times 10^{-3}$ mbar.

Moreover, it is provided that a layer is generated composed of $TiN_x$ (with x equal to or greater than 1, preferably x=1.05), via reactive sputtering from a Ti-target with a magnetron in the presence of a sputter gas mixture comprising Ar and $N_2$, under a pressure of approximately $5 \times 10^{-3}$ mbar.

Furthermore, it is suggested that a layer is generated composed of NiCr-oxide via reactive sputtering from a target comprising NiCr, preferably 80 weight percent Ni, 20 weight percent Cr, with a magnetron in the presence of a sputter gas mixture comprising Ar and $O_2$, under a pressure of approximately $5 \times 10^{-3}$ mbar.

Alternative methods consist thereof that an actually known sputtering process is employed for the coating, that an actually known Chemical Vapor Deposition method (CVD) is employed, that an actually known plasma supported Chemical Vapor Deposition method (CVD) is employed, that an actually known pyrolyse-method is employed.

Good antistatic effects are achieved in that the front side of the layer system facing the observer has a surface resistance of 100 to 400 ohm per square, preferably 150 ohm per square.

Furthermore, it can be provided that the backside layer of the layer system, on a side of the substrate not facing the observer, has a thickness in the range from 40 to 200 angstrom and a surface resistance of 150 to 500 ohm per square, preferably 450 ohm per square.

The following advantages are achieved with the invention. The initially described problems are solved. A high antireflection coating is achieved as well as a strik9ng increase of contrast. By reducing, or respectively, preventing electrostatic charging the antistatic effect is improved. The anti-reflection effect is increased particularly in that the layer reflecting from the backside of the substrate is weakened via absorption in the layer system of the front side. By that a total antireflection coating is achieved which is advantageous over known comparable systems.

Compared with the known systems the total thickness of the coating is small.

The soft metal layers in the case of known metal optical units, used as antireflective layers, are replaced by the hard scratch-resistant TiN-layer of the invention. On the one hand, this layer has ceramic hardness and, on the other hand, a metal-type optical effect.

The low number of layers of the layer system, the thinness of the individual layers of the layer system, the selection of inexpensive material and the ability to sputter in DC-reactive fashion with a magnetron from a metal target, lead to an economical manufacturing of the inventive antireflective systems.

More details of the invention, the stated object and the achieved advantages can be taken from the following description of several exemplary embodiments of the invention.

DESCRIPTION OF THE PREFERRED EMBODIMENTS

Figure 1:
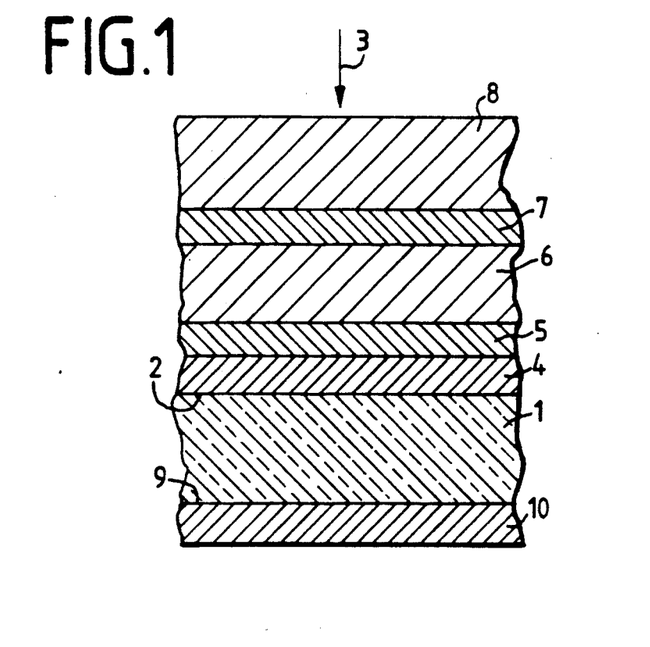
FIG. 1 is a cross-sectional view of a layer system applied to a substrate.
Figure 2:
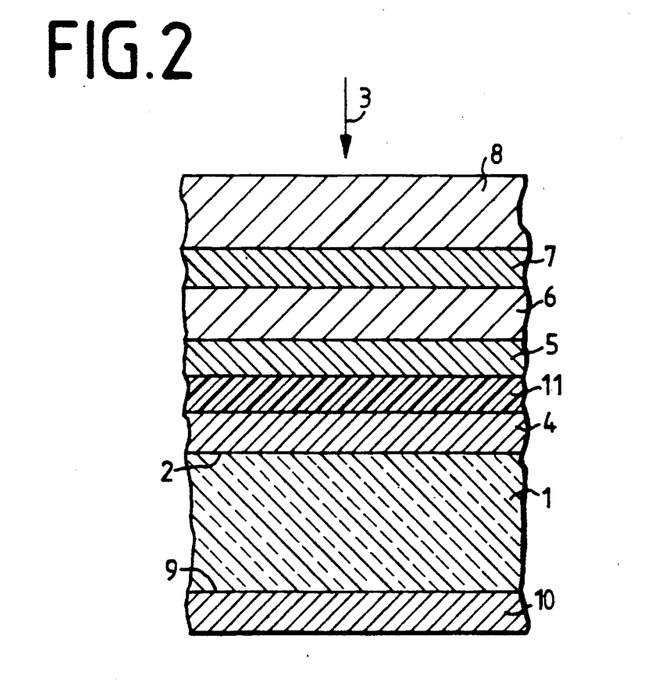
FIG. 2 is a cross-sectional view of an alternate embodiment of the layer system applied to the substrate.

In the immediately following description, five exemplary embodiments are described with respect to FIGS. 1 and 2.

A substrate 1 is composed of a transparent material such as glass. A front side 2 of the substrate is that side of the substrate facing an observer viewing from a direction indicated by an arrow 3. A back side 9 of the substrate is that side of the substrate not facing the observer. That layer arranged on the front side of the substrate is a first layer 4. In the direction toward the observer follows the second layer 5, and a third layer 6, a fourth layer 7, and a fifth layer 8.

A layer system of a first exemplary embodiment is structured as follows according to FIG. 1. On the backside of the substrate 1 composed of glass, an optically effective backside layer 10 composed of $TiN_x$ is applied. In the direction toward the observer follows the substrate 1. A first optically effective layer is the first layer 4, arranged on the substrate 1 on the frontside 2, and composed of $SnO_2$. A second optically effective layer is the second layer 5 following the first layer 4 in the direction toward the observer, arranged on the first layer 4, composed of $TiN_x$. A third optically effective layer is the third layer 6, following the second layer 5 in the direction toward the observer, arranged on the second layer 5, and composed of $SnO_2$. A fourth optically effective layer is the fourth layer 7, following the third layer 6 in the direction toward the observer, arranged on the third layer 6, and composed of $TiN_x$. A fifth optically effective layer is the fifth layer 8, following the fourth layer in the direction toward the observer, arranged on the fourth layer 7, and composed of $Al_2O_3$.

A layer system of a second exemplary embodiment is structured as follows corresponding to FIG. 2. On the backside 9 of the substrate 1 composed of glass, an optically effective backside layer 10 composed of $TiN_x$ is applied. In the direction toward the observer follows the substrate 1. A first optically effective layer is the first layer 4, arranged on the substrate 1 on the front side 2, and composed of $SnO_2$. In the direction toward the observer follows an adhesive layer 11, arranged on the first layer 4, and composed of NiCr-oxide. A second optically effective layer is the second layer 5, following in the direction toward the observer, arranged on the adhesive layer 11, and composed of $TiN_x$. A third optically effective layer is the third layer 6, following the second layer 5 in the direction toward the observer, arranged on the second layer 5, and composed of $SnO_2$. A fourth optically effective layer is the fourth layer 7, following the third layer 3 in direction toward the observer, arranged on the third layer 3, and composed of $TiN_x$. A fifth optically effective layer is the fifth layer 8, following the fourth layer 7 in the direction toward the observer, arranged on the fourth layer 7, and composed of $Al_2O_3$.

A layer system of a third exemplary embodiment is structured as follows according to FIG. 2. On the backside 9 of the substrate 1 composed of glass, an optically effective backside layer 10 composed of $TiN_x$, is applied. In the direction toward the observer, follows the substrate 1. A first optically effective layer is the first layer 4 arranged on the substrate 1, and composed of $SnO_2$. In the direction toward the observer follows an adhesive layer 11, arranged on the first layer 4, and composed of NiCr-oxide. A second optically effective layer is the second layer 5 following in the direction toward the observer, arranged on the adhesive layer 11, and composed of $TiN_x$. A third optically effective layer is the third layer 6 following the second layer 5 in the direction toward the observer, arranged on the second layer 5, and composed of $SnO_2$. A fourth optically effective layer is the fourth layer 7, following the third layer 6 in the direction toward the observer, arranged on the third layer, and composed of $TiN_x$. A fifth optically effective layer is the fifth layer 8, following the fourth layer 7 in the direction toward the observer, arranged on the fourth layer 7, and composed of $SiO_2$.

A layer system of a fourth exemplary embodiment is structured as follows according to FIG. 1. On the backside 9 of the substrate 1 composed of glass an optically effective backside layer 10 composed of $TiN_x$, is applied. In the direction toward the observer follows the substrate 1. A first optically effective layer is the first layer 4, arranged on the substrate 1, and composed of NiCr-oxide; this first layer 4 simultaneously functions as an adhesive layer. A second optically effective layer is the second layer 5, following in the direction toward the observer, arranged on the first layer 4, and composed of $TiN_x$. A third optically effective layer is the third layer 6, following the second layer 5 in the direction toward the observer, arranged on the second layer 5, and composed of $SnO_2$. A fourth optically effective layer is the fourth layer 7, following the third layer 6 in the direction toward the observer, arranged on the third layer 6, and composed of $TiN_x$. A fifth optically effective layer is the fifth layer 8, following the fourth layer 7 in the direction toward the observer, arranged on the fourth layer 7, and composed of $Al_2O_3$.

A layer system of a fifth exemplary embodiment is structured as follows according to FIG. 1. On the backside of the substrate 1 composed of glass an optically effective backside layer 10 composed of $TiN_x$, is applied. In the direction toward the observer follows the substrate 1. A first optically effective layer is the first layer 4, arranged on the substrate 1, and composed of NiCr-oxide; this first layer 4 simultaneously functions as an adhesive layer. A second optically effective layer is the second layer 5, following in the direction toward the observer, arranged on the first layer 4, and composed of $TiN_x$. A third optically effective layer is the third layer 6, following the second layer 5 in the direction toward the observer, arranged on the second layer 5, and composed of $SnO_2$. A fourth optically effective layer is the fourth layer 7, following the third layer 6 in the direction toward the observer, arranged on the third layer 6, and composed of $TiN_x$. A fifth optically effective layer is the fifth layer 8, following the fourth layer 7 in the direction toward the observer, arranged on the fourth layer 7, and composed of $Al_2O_3$.

Apart from mineral glass, float glass, plexi-glass, see-through plastic layers, foils etc. can be employed as substrates. Apart from the antireflection coating for the frontside 2 via the described layer systems arranged toward the observer, a further surprisingly low total reflection is achieved via the backside layer 10 composed of $TiN_x$ arranged on the backside 9.

The basic idea of the invention permits a plurality of exemplary embodiments, or respectively, layer systems, which are characterized by the subsequently cited materials and layer thicknesses:

First layer 4, a dielectric: metal oxide ($SnO_2$, $ZrO_2$, ZnO, $Ta_2O_5$, NiCr-oxide, $TiO_2$, $Sb_2O_3$, $In_2O_3$), layer thickness: 170 angstrom +/−20%;

Second layer 5: nitride (TiN, ZrN), layer thickness: 170 angstrom +/−20%;

Third layer 6 dielectric: Metal oxide ($SnO_2$, $ZrO_2$, ZnO, $Ta_2O_5$, NiCr-oxide, $TiO_2$, $Sb_2O_3$, $In_2O_3$), layer thickness: 500 angstrom +/−20%;

Fourth layer 7: nitride (TiN, ZrN), layer thickness: 110 angstrom +/−20%;

Fifth layer 8, dielectric: low-refracting materials, n smaller than 1.7, ($SiO_2$, $Al_2O_3$, AlSi-oxide, NiSi-oxide, $MgF_2$), Optical thickness: 5550/4 angstrom +/−10%;

Adhesive layer 11: Ni, Cr, NiCr (80 weight percent Ni, 20 weight per cent Cr), layer thickness 10 angstrom +/−10%;

Backside layer 10: $TiN_x$, layer thickness: 40–150 angstrom.

It is a matter of course that such values for the respective layer thickness are selected within the cited layer thickness tolerances, which take into account the interdependence between the individual layer thicknesses and the materials used.

In the following, the description of two examples of layer systems follows, whereby the reflection and the transmission were measured in the visible wave range of the light. The results of the measurement are graphically illustrated with curves in the FIGS. 3 and 4. The description of the layer systems uses the reference symbols of the description of FIG. 1.

The layer system of a first example is structured as follows:

Substrate 1 material: glass, thickness 2 mm, refractive coefficient n=1.52.
First layer 4, material: $SnO_2$, thickness 170 angstrom, refractive coefficient n=2.05.
Second layer 5, material: $TiN_x$, thickness 190 angstrom.
Third layer 6, material: $SnO_2$, thickness 500 angstrom, refractive coefficient n=2.05.
Fourth layer 7, material: $TiN_x$, thickness 130 angstrom.
Fifth layer 8, material: $Al_2O_3$, thickness 730 angstrom, refractive coefficient N=1.6.
Backside layer 10, material: $TiN_x$, thickness 70 angstrom.

The adhesive layer 11 in FIG. 2 is not used in this exemplary embodiment.

For this above described layer system of the first example, reflection and transmission were measured in percent, namely for a wavelength range from 400 nm to 700 nm. Subsequently, the measurement results of reflection and transmission are compared to certain wavelengths in a table:

| wavelength (nm) | reflection (%) | transmission (%) |
| --- | --- | --- |
| 440 | 0.48 | 25.7 |
| 480 | 0.64 | 28.2 |
| 520 | 0.61 | 29.4 |
| 560 | 0.40 | 29.0 |
| 600 | 0.30 | 28.1 |
| 640 | 0.29 | 26.2 |
| 680 | 0.32 | 23.8 |

Figure 3:
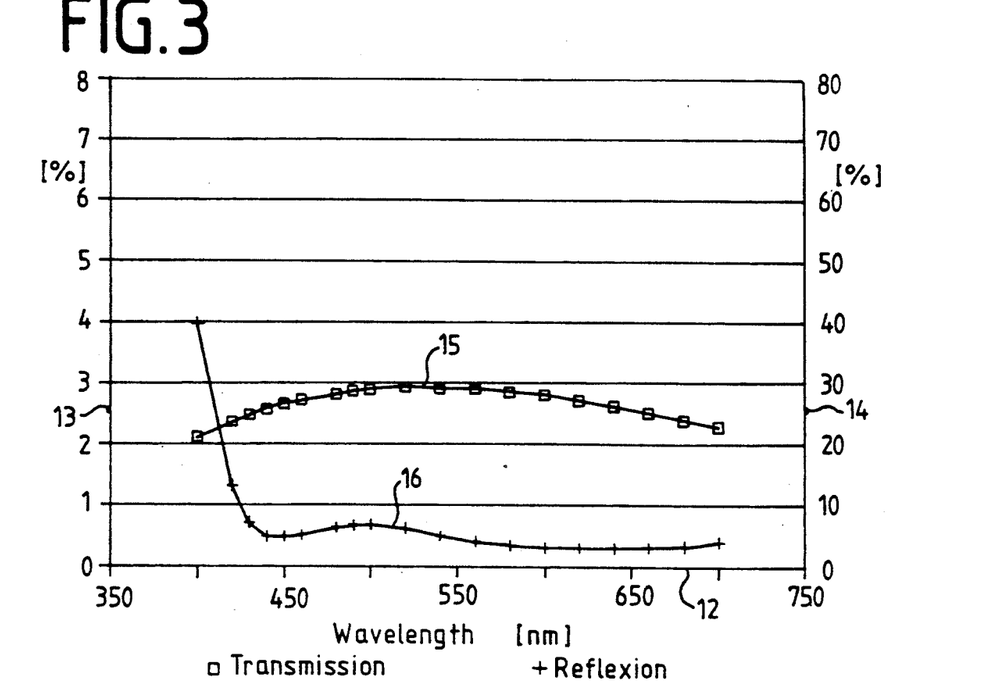
FIG. 3 is a graph showing transmission and reflection curves for a first example of an embodiment of a layer system of the present invention.

The measurement results, as shown, are graphically illustrated in FIG. 3. On the abscissa 12 of the system of coordinates in FIG. 3 the wavelengths are entered in nm. On the left ordinate 13 of the coordinate system percent values for reflection are entered. On the right ordinate 14 of the coordinate system percent values for transmission are entered.

The curves of FIG. 3 reveal clearly that a reflection curve 16 in the core wavelength region of the visible light is extraordinarily low. It lies far under 1%. By that, a desired high antireflective effect has been achieved in surprisingly clear fashion. In the same core wavelength region a transmission curve 15 has relatively high values.

The layer system of a second example is characterized as follows:

Substrate 1, material: glass, thickness 2 mm, refractive coefficient n=1.52.
First layer 4, material: $SnO_2$, thickness 170 angstrom, refractive coefficient n=2.1.
Second layer 5, material: $TiN_x$, thickness 170 angstrom.
Third layer 6, material: $SnO_2$, thickness 500 angstrom, refractive coefficient n=2.05.
Fourth layer 7, material: $TiN_x$, thickness 110 angstrom.
Fifth layer 8, material: $SiO_2$, thickness 730 angstrom, refractive coefficient N=1.5.
Backside layer 10, material: $TiN_x$, thickness 70 angstrom.

No extra adhesive layer 11, shown in FIG. 2 is used in this exemplary embodiment.

For this above described layer system of the second example, reflection and transmission were measured in per cent, namely for a wavelength range from 400 nm to 700 nm. Subsequently, the measured results of reflection and transmission are compared to certain wavelengths in a table:

| wavelength (nm) | reflection (%) | transmission (%) |
| --- | --- | --- |
| 440 | 1.22 | 25.6 |
| 480 | 0.26 | 28.8 |
| 520 | 0.24 | 30.2 |
| 560 | 0.26 | 30.4 |
| 600 | 0.29 | 29.5 |
| 640 | 0.31 | 28.0 |
| 680 | 0.34 | 25.9 |

Figure 4:
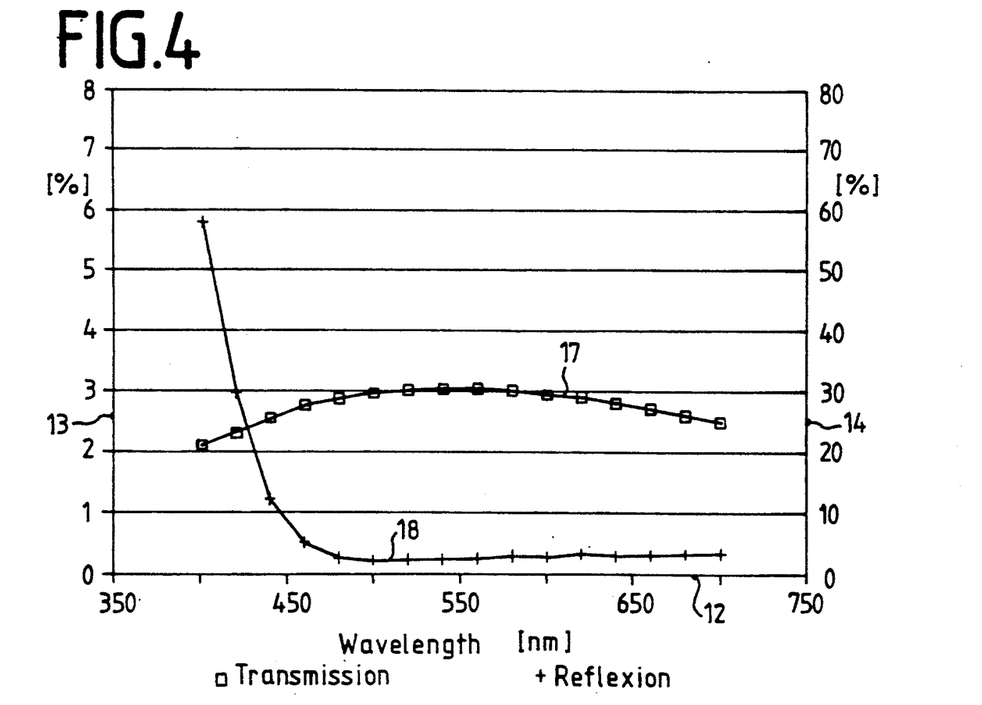
FIG. 4 is a graph showing transmission and reflection curves of a second example of an embodiment of the layer system of the present invention.

The measured results, as shown, are graphically illustrated as curves in FIG. 4. The abscissa and the ordinates carry the measuring units described in connection with FIG. 3.

A reflection curve 18 reveals clearly that reflection has an extreme low point in the region of approximately 500 nm wavelength. By that, a desired high antireflective effect has also been achieved in a convincing manner in this example. A transmission curve 17 has its maximum in the core region of the visible light.

The following comments need to be made regarding the transmission curve 15 (FIG. 3) and regarding the transmission curve 17 (FIG. 4):

Low transmission values of an attachment disk can be compensated in a simple manner by intensifying the light source, e.g. by turning up the potentiometer in the case of a LCD.

The layer systems with which the above commented-on transmission and reflection values were achieved, were manufactured according to the method described in the following:

The sputtering was performed with a magnetron in a reactive gas atmosphere.

In the following, the left column indicates the sputtering material, the right column the reactive sputter mixture:

| | |
| --- | --- |
| $SnO_2$ | $Ar + O_2$ |
| $SiO_2$ | $Ar + O_2$ |
| $Al_2O_3$ | $Ar + O_2$ |
| TiN | $Ar + N_2$ |
| NiCr | $Ar + O_2$ |

Pressure during the sputtering event: approximately $5 \times 10^{-3}$ mbar.

Target material: Sn, Si, Ti, NiCr (80 weight per cent Ni, 20 weight per cent Cr), Al.

On a front side of the layer systems toward the observer, a surface resistance of 150 Ohm per square was measured, on a backside of the layer systems a surface resistance of 450 ohm per square. These are relatively low surface resistances.

By grounding the surfaces the static charge can be reduced or even eliminated. Thus, the desired antistatic effect is achieved.

Although the present invention has been described with reference to a specific embodiment, those of skill in the art will recognize that changes may be made thereto without departing from the scope and spirit of the invention as set forth in the appended claims.

We claim as our invention:

1. An anti-reflective layer system for substrates comprising:
   a first layer arranged on the substrate on a side of the substrate toward an observer, functioning as a dielectric and comprising metal oxide;

a second layer arranged on said first layer, comprising nitride;

a third layer arranged on said second layer, functioning as a dielectric and comprising metal oxide;

a fourth layer arranged on said third layer, comprising nitride;

and a fifth layer arranged on said fourth layer, functioning as a dielectric and comprising metal oxide;

wherein said second layer comprises nitrides selected from the group including $TiN_x$, where x is equal to or greater than 1, and ZrN.

2. A layer system according to claim 1, wherein said first layer comprises oxides selected from the group including: $SnO_x$, x is equal to or less than 2, $ZrO_2$, ZnO, $Ta_2O_5$, NiCr-oxide, $TiO_2$, $Sb_2O_3$, $In_2O_3$, and mixed oxides from oxides of this group.

3. The layer system according to claim 1, wherein the layer system is applied to a substrate composed of glass, and wherein said first layer comprises $SnO_y$, y is equal to or less than 2;
   said second layer comprises $TiN_x$, x is equal to or greater than 1;
   said third layer comprises $SnO_z$; z is equal to or less than 2;
   said fourth layer comprises $TiN_w$, w is equal to or greater than 1;
   said fifth layer comprises $Al_2O_3$;
   and wherein said layer system further comprises a backside layer, applied to a side of the substrate opposite from the observer, comprising $TiN_u$, u is equal to or greater than 1.

4. A layer system according to claim 3, wherein x equals 2; y equals 1.05; z equals 2; w equals 1.05; and u equals 1.05.

5. The layer system according to claim 1, wherein said layer system is applied to a substrate composed of glass, and wherein said first layer comprises $SnO_y$, y is equal to or less than 2;
   said second layer comprises $TiN_x$, x is equal to or greater than 1;
   said third layer comprises $SnO_z$, z is equal to or less than 2;
   said fourth layer comprises $TiN_w$, w is equal to or greater than 1;
   said fifth layer comprises $Al_2O_3$;
   and wherein said layer system further comprises an adhesive layer, arranged between said first layer and said second layer, comprising $NiCrO_x$;
   and wherein said layer system further comprises a backside layer, arranged on a side of the substrate opposite from the observer, comprising $TiN_u$, u is equal to or greater than 1.

6. A layer system according to claim 5, wherein x equal 2; y equals 1.05; z equals 2; w equals 1.05; and u equal 1.05.

7. The layer system according to claim 1, wherein said layer system is applied to a substrate composed of glass, and wherein said first layer comprises $SnO_y$, y is equal to or less than 2;
   said second layer comprises $TiN_x$, x is equal to or higher than 1;
   said third layer comprises $SnO_z$, z is equal to or less than 2;
   said fourth layer comprises $TiN_w$, w is equal to or greater than 1;
   said fifth layer comprises $SiO_2$;
   and said layer system further comprises an adhesive layer, arranged between said first and said second layers, comprising a material selected from the group including NiCr and NiCr-suboxide;
   and said layer system further comprises a backside layer, applied to a side of the substrate opposite from the observer, comprising $TiN_u$, u is equal to or greater than 1.

8. A layer system according to claim 7, wherein x equal 2; y equals 1.05; z equals 2; w equals 1.05; and u equals 1.05.

9. The layer system according to claim 1, wherein the substrate is composed of glass, and wherein said first layer comprises NiCr-suboxide, functioning as dielectric and as an adhesive;
   said second layer comprises $TiN_x$, x is equal to or greater than 1;
   said third layer comprises $SnO_y$, y is equal to or less than 2;
   said fourth layer comprises $TiN_z$, z is equal to or greater than 1;
   said fifth layer comprises $Al_2O_3$;
   and said layer system further comprises a backside layer, applied to a side of the substrate opposite of the observer, comprising $TiN_w$, w is equal to or more than 1.

10. A layer system according to claim 9, wherein x equals 1.05; y equals 2; z equals 1.05; and w equals 1.05.

11. The layer system according to claim 1, wherein said layer system is applied to a substrate composed of glass, and wherein said first layer comprises NiCr-suboxide, functioning as dielectric and as an adhesive;
    said second layer comprises $TiN_x$, x is equal to or greater than 1;
    said third layer comprises $SnO_y$, y is equal to or less than 2;
    said fourth layer comprises $TiN_w$, w is equal to or greater than 1;
    said fifth layer comprises $SiO_2$;
    and said layer system further comprises a backside layer, applied to a side of the substrate opposite to the observer, comprising $TiN_z$, z is equal to or greater than 1.

12. A layer system according to claim 11, wherein x equals 1.05; y equals 2; w equals 1.05; and z equals 1.05.

13. The layer system according to claim 1, wherein said layer system is applied to a substrate composed of glass, with a refractive index of n=1.52, wherein said first layer comprises $SnO_y$, y is equal to or less than 2, and has a thickness of 170 angstrom;
    said second layer comprises $TiN_x$, x is equal to or greater than 1, and has a thickness of 190 angstrom;
    said third layer comprises $SnO_z$, z is equal to or less than 2, and has a thickness of 500 angstrom;
    said fourth layer comprises $TiN_w$, w is equal to or greater than 1, and has a thickness of 130 angstrom; and
    said fifth layer comprises $Al_2O_3$, and has a thickness of 730 angstrom.

14. The layer system according to claim 1, wherein the substrate is composed of glass with a refractive index of n=1.52, and wherein said first layer comprises $SnO_y$, y is equal to or less than 2, and has a thickness of 170 angstrom;
    said second layer comprises $TiN_x$, x is equal to or greater than 1, and has a thickness of 175 angstrom;
    said third layer comprises $SnO_z$, z is equal to or less than 2, and has a thickness of 500 angstrom;

said fourth layer comprises TiN$_w$, w is equal to or greater than 1, and has a thickness of 110 angstrom; and said fifth layer comprises Al$_2$O$_3$, and has a thickness of 730 angstrom.

15. A layer system according to claim 1, wherein x equals 1.05.

16. A layer system according to claim 1, wherein said second layer comprises TiN$_x$, x is equal to or greater than one.

17. A layer system according to claim 16, wherein said fourth layer comprises TiN$_x$, x is equal to or greater than 1.

18. An anti-reflective layer system for substrates comprising:
   a first layer arranged on the substrate on a side of the substrate toward an observer, functioning as a dielectric and comprising metal oxide;
   a second layer arranged on said first layer, comprising nitride;
   a third layer arranged on said second layer, functioning as a dielectric and comprising metal oxide;
   a fourth layer arranged on said third layer, comprising nitride;
   and a fifth layer arranged on said fourth layer, functioning as a dielectric and comprising metal oxide;
   wherein said third layer comprises oxides selected from the group including: SnO$_x$, x is equal to or less than 2, ZrO$_2$, ZnO, Ta$_2$O$_5$, Nicro-oxide, TiO$_2$, Sb$_2$O$_3$, In$_2$O$_3$ and mixed oxides from oxides of this group.

19. A layer system according to claim 18, wherein said fifth layer comprises oxides selected from the group: SiO$_2$, Al$_2$O$_3$, AlSi-oxide, NiSi-oxide, MgO and oxide fluorides from this group.

20. A layer system according to claim 18, wherein x equals 2.

21. An anti-reflective layer system for substrates comprising:
   a first layer arranged on the substrate on a side of the substrate toward an observer, functioning as a dielectric and comprising metal oxide;
   a second layer arranged on said first layer, comprising nitride;
   a third layer arranged on said second layer, functioning as a dielectric and comprising metal oxide;
   a fourth layer arranged on said third layer, comprising nitride;
   and a fifth layer arranged on said fourth layer, functioning as a dielectric and comprising metal oxide;
   wherein said fourth layer comprises nitrides selected from the group TiN$_x$, where x is equal to or greater than 1, and ZrN.

22. A layer system according to claim 21, wherein said fifth layer comprises a material with a refractive index n is equal to or smaller than 1.7.

23. A layer system according to claim 21, wherein x equals 1.05.

24. An anti-reflective layer system for substrates comprising:
   a first layer arranged on the substrate on a side of the substrate toward an observer, functioning as a dielectric and comprising metal oxide;
   a second layer arranged on said first layer, comprising nitride;
   a third layer arranged on said second layer, functioning as a dielectric and comprising metal oxide;
   a fourth layer arranged on said third layer, comprising nitride;
   and a fifth layer arranged on said fourth layer, functioning as a dielectric and comprising metal oxide;
   wherein said fifth layer comprises MgF$_2$.

25. An anti-reflective layer system for substrates comprising:
   a first layer arranged on the substrate on a side of the substrate toward an observer, functioning as a dielectric and comprising metal oxide;
   a second layer arranged on said first layer, comprising nitride;
   a third layer arranged on said second layer, functioning as a dielectric and comprising metal oxide;
   a fourth layer arranged on said third layer, comprising nitride;
   and a fifth layer arranged on said fourth layer, functioning as a dielectric and comprising metal oxide;
   wherein said layer system further comprises an adhesive layer arranged between said first layer and said second layer.

26. A layer system according to claim 25, wherein said adhesive layer comprises a material selected from the group including Ni and NiO$_x$, x is less than 1.

27. A layer system according to claim 25, wherein said adhesive layer comprises a material selected from the group including: Cr, Cr-suboxide, and NiCr alloy.

28. A layer system according to claim 25, wherein said adhesive layer comprises a NiCr alloy, with said alloy comprising 80 weight percent Ni and 20 weight percent Cr, Cr selected from Cr and Cr-suboxide.

29. An anti-reflective layer system for substrates comprising:
   a first layer arranged on the substrate on a side of the substrate toward an observer, functioning as a dielectric and comprising metal oxide;
   a second layer arranged on said first layer, comprising nitride;
   a third layer arranged on said second layer, functioning as a dielectric and comprising metal oxide;
   a fourth layer arranged on said third layer, comprising nitride;
   and a fifth layer arranged on said fourth layer, functioning as a dielectric and comprising metal oxide;
   wherein said first layer comprises NiCr-suboxide functioning also as an adhesive.

30. An anti-reflective layer system for substrates comprising:
   a first layer arranged on the substrate on a side of the substrate toward an observer, functioning as a dielectric and comprising metal oxide;
   a second layer arranged on said first layer, comprising nitride;
   a third layer arranged on said second layer, functioning as a dielectric and comprising metal oxide;
   a fourth layer arranged on said third layer, comprising nitride;
   and a fifth layer arranged on said fourth layer, functioning as a dielectric and comprising metal oxide;
   wherein said layer system is applied to a substrate composed of glass, and wherein said first layer has a thickness of 170 angstrom ±20%;
   said second layer has a thickness of 170 angstrom ±20%;
   said third layer has an optical thickness of 5550/4 angstrom ±20%;
   said fourth layer has a thickness of 110 angstrom ±20%;

and said fifth layer has an optical thickness of 5550/4 angstrom ±10%;

such layer thicknesses selected with the cited thickness tolerances taking into account the interdependence between the layer thicknesses and materials selected for the layers.

31. An anti-reflective layer system for substrates comprising:

a first layer arranged on the substrate on a side of the substrate toward an observer, functioning as a dielectric and comprising metal oxide;

a second layer arranged on said first layer, comprising nitride;

a third layer arranged on said second layer, functioning as a dielectric and comprising metal oxide;

a fourth layer arranged on said third layer, comprising nitride;

and a fifth layer arranged on said fourth layer, functioning as a dielectric and comprising metal oxide; and further comprising a backside layer, applied to a back side of the substrate not facing the observer, said backside layer comprising $TiN_x$, X is equal to or greater than 1.

32. A layer system according to claim 31, wherein the substrate is composed of glass having a thickness of 2 mm, and a refractive index n=1.52; and said backside layer and has a thickness of 70 angstrom;

said first layer comprises $SnO_y$, y is equal to or less than 2, having a thickness of 170 angstrom and a refractive index n=2.05;

said second layer comprises $TiN_z$, z is equal to or greater than 1, having a thickness of 190 angstrom;

said third layer comprises $SnO_w$, w is equal to or smaller than 2, having a thickness of 500 angstrom and a refractive coefficient n=2.05;

said fourth layer comprises $TiN_u$, u is equal to or greater than 1, and having a thickness of 130 angstrom; and said fifth layer comprises $Al_2O_3$, having a thickness of 730 angstrom, and a refractive index n=1.6.

33. A layer system according to claim 31, wherein said substrate is composed of glass, has a thickness of 2 mm and a refractive index n=1.52;

said backside layer has a thickness of 70 angstrom;

said first layer comprises NiCr-suboxide, having a thickness of 170 angstrom and a refractive index n=2.1;

said second layer comprises $TiN_y$, y is equal to or greater than 1, having a thickness of 170 angstrom;

said third layer comprises $SnO_w$, w is equal to or less than 2, having a thickness of 500 angstrom and a refractive coefficient n=2.05;

said fourth layer comprises $TiN_z$, z is equal to or greater than 1, and having a thickness of 110 angstrom; and said fifth layer comprises $SiO_2$, having a thickness of 730 angstrom and a refractive index n=1.5.

34. A layer system according to claim 31, wherein said backside layer has a thickness in the range from 40 to 200 angstrom, and a surface resistance of 150 to 500 ohms per square.

35. A layer system according to claim 34, wherein said surface resistance is approximately 450 ohm per square.

36. A layer system according to claim 31, wherein x equals 1.05.

37. A method for manufacturing a coating for an optically effective layer system for substrates, the coating having an anti-reflective effect, comprising the following steps:

on a side of the substrate which faces an observer, apply a first layer functioning as a dielectric and comprising metal oxide;

apply a second layer covering said first layer comprising $TiN_x$, where x is equal to or greater than 1;

apply a third layer covering said second layer, functioning as a dielectric and comprising metal oxide;

apply a fourth layer covering said third layer, comprising $TiN_x$, where x is equal to or greater than 1;

apply a fifth layer covering said fourth layer, functioning as a dielectric, and comprising metal oxide;

wherein said layers are applied using a DC-reactive sputtering method from targets with a magnetron.

38. A method according to claim 37, wherein the substrate is composed of glass, and wherein a layer is generated composed of NiCr-suboxide, via reactive sputtering from a target comprising NiCr comprising 80 weight percent Ni, 20 weight percent Cr, with said magnetron, in the presence of a sputtering gas mixture comprising Ar and $O_2$, using a pressure of approximately $5 \times 10^{-3}$ mbar.

39. A method according to claim 37, wherein a chemical vapor deposition method is employed.

40. A method for manufacturing a coating for an optically effective layer system for substrates, the coating having an antireflective effect, comprising the following steps:

on a side of the substrate which faces an observer, apply a first layer functioning as a dielectric and comprising metal oxide;

apply a second layer covering said first layer comprising nitride;

apply a third layer covering said second layer, functioning as a dielectric and comprising metal oxide;

apply a fourth layer covering said third layer, comprising nitride;

apply a fifth layer covering said fourth layer, functioning as a dielectric, and comprising metal oxide;

wherein said layers are applied using a DC-reactive sputtering method from targets with a magnetron;

wherein the substrate is composed of glass, and wherein at least one of said layers is generated composed of $SnO_x$, x is equal to or less than 2, via reactive sputtering from a Sn target with said magnetron, in the presence of a sputtering gas mixture comprising Ar and $O_2$, using a pressure of approximately $5 \times 10^{-3}$ mbar.

41. A method for manufacturing a coating for an optically effective layer system for substrate, the coating having an antireflective effect, comprising the following steps:

on a side of the substrate which faces an observer, apply a first layer functioning as a dielectric and comprising metal oxide;

apply a second layer covering said first layer comprising nitride;

apply a third layer covering said second layer, functioning as a dielectric and comprising metal oxide;

apply a fourth layer covering said third layer, comprising nitride;

apply a fifth layer covering said fourth layer, functioning as a dielectric, and comprising metal oxide;

wherein said layers are applied using a DC-reactive sputtering method from targets with a magnetron;

wherein the substrate is composed of glass, and wherein a layer is generated composed of $SiO_2$, by reactive sputtering from an Si-target with said magnetron, in the presence of a sputtering gas mixture comprising Ar and $O_2$, using a pressure of approximately $5\times 10^{-3}$ mbar.

42. A method for manufacturing a coating for an optically effective layer system for substrates, the coating having an antireflective effect, comprising the following steps:

on a side of the substrate which faces an observer, apply a first layer functioning as a dielectric and comprising metal oxide;

apply a second layer covering said first layer comprising nitride;

apply a third layer covering said second layer, functioning as a dielectric and comprising metal oxide;

apply a fourth layer covering said third layer, comprising nitride;

apply a fifth layer covering said fourth layer, functioning as a dielectric, and comprising metal oxide;

wherein said layers are applied using a DC-reactive sputtering method from targets with a magnetron;

wherein the substrate is composed of glass, and wherein a layer is generated composed of $Al_2O_3$, via reactive sputtering from an Al-target with said magnetron, in the presence of a sputtering gas mixture comprising Ar and $O_2$, using a pressure of approximately $5\times 10^{-3}$ mbar.

43. A method for manufacturing a coating for an optically effective layer system for substrates, the coating having an antireflective effect, comprising the following steps:

on a side of the substrate which faces an observer, apply a first layer functioning as a dielectric and comprising metal oxide;

apply a second layer covering said first layer comprising nitride;

apply a third layer covering said second layer, functioning as a dielectric and comprising metal oxide;

apply a fourth layer covering said third layer, comprising nitride;

apply a fifth layer covering said fourth layer, functioning as a dielectric, and comprising metal oxide;

wherein said layers are applied using a DC-reactive sputtering method from targets with a magnetron;

wherein the substrate is composed of glass, and wherein a layer is generated composed of $TiN_x$, x is equal to or greater than 1, via reactive sputtering from a Ti-target with said magnetron, in the presence of a sputtering gas mixture comprising Ar and $N_2$, using a pressure of approximately $5\times 10^{-3}$ mbar.

44. A method for manufacturing a coating for an optically effective layer system for substrates, the coating having an antireflective effect, comprising the following steps:

on a side of the substrate which faces an observer,
- apply a first layer functioning as a dielectric and comprising metal oxide;

apply a second layer covering said first layer comprising nitride;

apply a third layer covering said second layer, functioning as a dielectric and comprising metal oxide;

apply a fourth layer covering said third layer, comprising nitride;

apply a fifth layer covering said fourth layer, functioning as a dielectric, and comprising metal oxide;

wherein said layers are applied using a DC-reactive sputtering method from targets with a magnetron;

wherein a plasma-supported chemical vapor deposition method is employed.

45. A method for manufacturing a coating for an optically effective layer system for substrates, the coating having an antireflective effect, comprising the following steps:

on a side of the substrate which faces an observer, apply a first layer functioning as a dielectric and comprising metal oxide;

apply a second layer covering said first layer comprising nitride;

apply a third layer covering said second layer, functioning as a dielectric and comprising metal oxide;

apply a fourth layer covering said third layer, comprising nitride;

apply a fifth layer covering said fourth layer, functioning as a dielectric, and comprising metal oxide;

wherein said layers are applied using a DC-reactive sputtering method from targets with a magnetron;

wherein a pyrolyse method is employed.

46. An antireflective layer system for substrates comprising:

a first layer arranged on the substrate on a side of the substrate toward an observer, functioning as a dielectric and comprising metal oxide;

a second layer arranged on said first layer, comprising nitride;

a third layer arranged on said second layer, functioning as a dielectric and comprising metal oxide;

a fourth layer arranged on said third layer, comprising nitride;

and a fifth layer arranged on said fourth layer, functioning as a dielectric and comprising metal oxide;

wherein said first layer comprises oxides selected from the group including: $SnO_x$, x is equal to 2, $ZrO_2$, $ZnO$, $Ta_2O_5$, NiCr-oxide, $TiO_2Sb_2O_3$, $In_2O_3$, and mixed oxides from oxides of this group.

47. An antireflective layer system for substrates comprising:

a first layer arranged on the substrate on a side of the substrate toward an observer, functioning as a dielectric and comprising metal oxide;

a second layer arranged on said first layer, comprising nitride;

a third layer arranged on said second layer, functioning as a dielectric and comprising metal oxide;

a fourth layer arranged on said third layer, comprising nitride;

and a fifth layer arranged on said fourth layer, functioning as a dielectric and comprising metal oxide;

wherein said fifth layer has a surface resistance, on a surface facing the observer, of 100 to 400 ohm per square.

48. A layer system according to claim 47, wherein said surface resistance is approximately 150 ohm per square.

* * * * *